June 22, 1943.  W. I. JONES  2,322,643
SNAP FASTENER
Filed Jan. 6, 1941
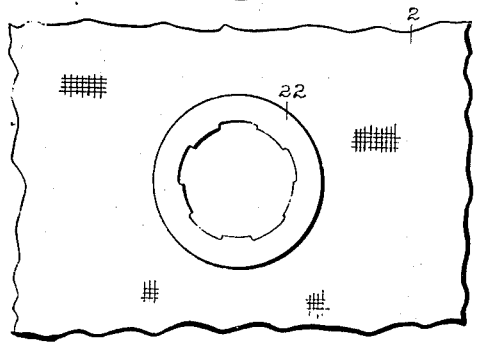
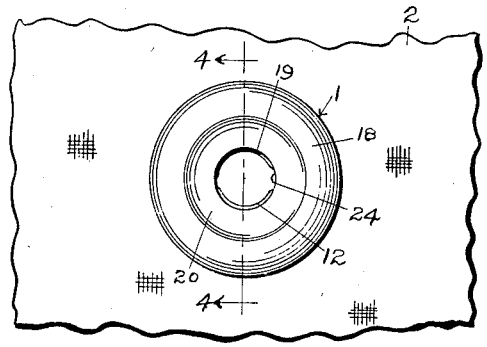
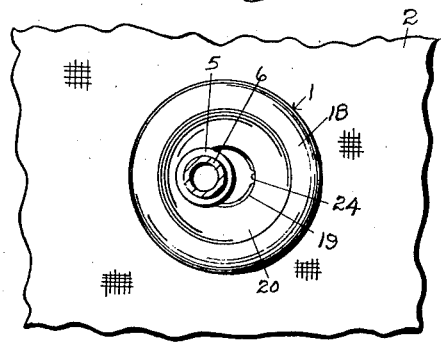
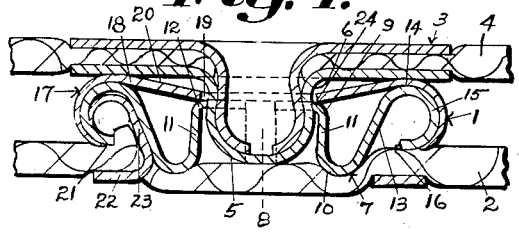
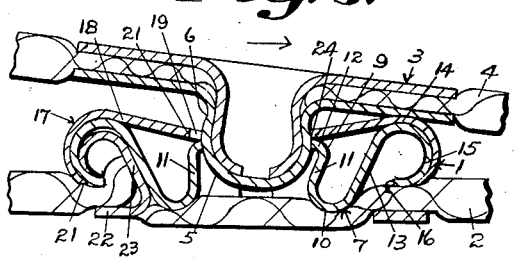
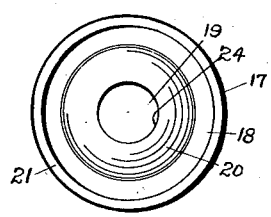
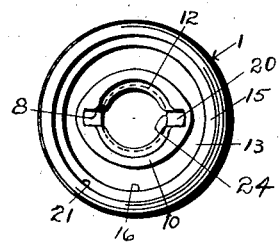
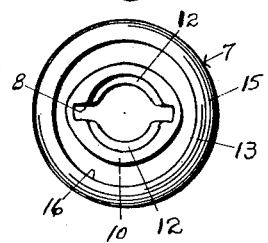
Inventor:
Walter I. Jones.
by John Todd
Atty.

Patented June 22, 1943

2,322,643

UNITED STATES PATENT OFFICE 2,322,643

SNAP FASTENER

Walter I. Jones, Belmont, Mass., assignor to United-Carr Fastener Corporation, Cambridge, Mass., a corporation of Massachusetts Application January 6, 1941, Serial No. 373,234

3 Claims. (Cl. 24—217)

This invention relates to stud and socket fastener assemblies and has for its main object to provide improvements in socket members, particularly of the so-called laundry-proof type, which have resilient portions adapted to engage the neck of a cooperating stud part.

One of the objects of my invention is the provision of a socket device having yieldable portions defining a stud-receiving aperture and a disk having an opening disposed forwardly of the stud-receiving aperture for marginal engagement with a stud to resist the tendency of the stud to move transversely to its line of normal engagement with the yieldable portions as a result of lateral strain exerted upon either the stud or socket member. This invention is particularly useful with socket members of the type having a body and a barrel divided by one or more slots so as to form yieldable portions for snap fastener engagement with a stud member due to the fact that the margin of the disk opening limits relative lateral movement of the stud and socket members so as to prevent one or more of the resilient portions from being deformed sufficiently by such lateral movement as to render the socket inoperative.

The restraining disk also operates to prevent the segments from being collapsed or deformed as a result of pressure exerted thereon by the stud when the stud is incorrectly aligned with the barrel in attempted fastener engagement of the parts.

Another object of my invention relates to the construction of the restraining disk wherein it is concaved adjacent the opening thereof so as to provide a lead for guiding the stud through the opening should the stud be moved toward the socket so as to be initially misaligned with the opening of the disk.

Other objects and uses of my invention will be apparent from inspection of the drawing and specification hereinbelow set forth.

Referring to the drawing, in which I have illustrated a preferred embodiment of my invention:

Fig. 1 is a top view of an installation showing one of my improved socket devices carried by a supporting strip;

Fig. 2 is a bottom view of the installation shown in Fig. 1;

Fig. 3 is a view similar to Fig. 2 and showing the manner in which the disk member forming a part of the socket device operates to guide a cooperating stud into fastener engagement with the socket;

Fig. 4 is an enlarged sectional view taken along the line 4—4 of Fig. 1 and showing a cooperating stud member in fastener engagement with the socket device;

Fig. 5 is a section similar to Fig. 4 and showing the manner in which the restraining member operates to limit relative lateral movement of the fastener elements;

Fig. 6 is a top elevation of the cap or restraining member forming a part of my improved socket device;

Fig. 7 is a top elevation of a socket member prior to assembly of the cap member therewith; and Fig. 8 is a top elevation showing the cap member in assembly with the socket member.

Referring to the drawing, I have shown a stud and socket installation comprising a socket device 1 carried by a strip of material 2 and a stud device 3 carried by a strip 4. The stud and socket devices are preferably of the so-called laundry-proof type in that they are adaptable for use on articles of apparel such as underwear, shirts and the like which are laundered regularly and both fastener devices are constructed to resist forces exerted upon the same under modern washing and ironing methods. The stud device 3, which is secured to the strip 4 in any suitable way, provides a stud portion having a head 5 and a constricted neck 6.

The socket device 1 includes a socket member 7 which, in the form chosen to illustrate my invention, is similar to the socket member which is the subject of my co-pending application Serial No. 332,467, filed April 30, 1940. The socket member 7 has a barrel portion which is open at both ends to receive the stud head 5. The barrel has a pair of slots 8—8 which extend from the forward end 9 of the barrel toward its rear end or base 10 dividing the barrel into a pair of similarly oppositely disposed resilient portions 11—11. The resilient portions 11 provide inwardly turned lip portions 12 at the forward end 9 of the barrel to engage the constricted portion 6 of the stud member. An annular flange portion 13 extends reversely from the rear end or base 10 of the barrel toward its forward end 9 and outwardly in a gradually sloping formation until the forward supporting portion 14 (Figs. 4 and 5) of the flange 13 is positioned forwardly of a horizontal plane (viewing Fig. 4) through the forward end 9 of the barrel. A U-shaped annular retainer ring 15 extends reversely from the forward surface 14 of the flange 13 and has its free edge 16 spaced from the sloping surface of the flange 13. As will be noted in Figs. 4 and 5 the cross-sectional configuration of the socket member 7 is substantially S-shaped.

An important feature of my invention is the provision of a restrainer member 17 which is attached to the socket member so as to be carried thereby. The restrainer member is in the form of a cap having a base or disk portion 18 disposed on the forward side of the socket member 7, when the parts of the device are in fixed assembly, and has a circular opening 19 for permitting the passage of the stud head 5 therethrough. The opening 19 is disposed forwardly of the forward end 9 of the barrel and has a diameter slightly greater than the diameter of the stud head 5 so that the lip portions 12 intersect the opening, as most clearly shown in Fig. 2. The disk 18 has an annular concave embossment 20 surrounding the opening 19 which is inclined from its circumference to its marginal edge 21. The embossment 20 operates as a lead for guiding the stud head 5 directly into the opening 19 should the parts be misaligned, as shown in Fig. 3, in initial engagement. The cap member 17 is secured to the socket member 7 through crimping its marginal edge 21 over the outer surface of the retainer ring 15, as shown most clearly in Figs. 4 and 5.

The socket member 7 with cap member attached is secured to the supporting strip 2 through means of an attaching member having a base 22 which may be in the form of a ring and integral prong-shaped attaching portions 23 (Figs. 4 and 5) extending outwardly from the inner edge of the ring. In assembly of the parts the prongs 23 are projected through the strip 2 and against the sloping flange 13 of the socket member 7 by which they are turned into the retainer ring 15. Thus the prongs 23 are securely engaged with the socket member 7 so that the strip 2 is clamped between the ring 22 and the socket member.

As a result of the particular construction of my socket device, wherein I have provided the restraining member 17, the wall or margin 24 surrounding the opening 19 of the restraining member acts to limit movement of one of the parts in a direction transverse to their normal direction of engagement. Thus, in use of the stud and socket members on certain apparel, a lateral strain may be exerted on either the stud or socket member which may be so great as to deform one or more of the segments 11 of the barrel so as to render the socket inoperative. The restraining member 17 acts to limit lateral movement of the stud member relative to the socket member, as most clearly shown in Fig. 5. Thus (referring to Fig. 5), should strain be exerted on the carrying material 4 laterally in the direction of the arrow, the stud member tends to pull the right-hand segment 11 laterally until the stud contacts the wall 24 of the opening 19. The wall 24 limits further lateral movement of the stud and the segment 11, which was pulled laterally under the pressure exerted thereon by the stud, has not been deformed sufficiently to set in distorted position or otherwise be prohibited from returning to normal shape so as to be completely operable.

Another advantage of the restraining member results from the fact that it is impossible to collapse or deform the yieldable segments 11 by pressure of the stud against the forward ends of the segments when the stud is incorrectly aligned with the barrel opening during attempted engagement thereof with the socket. Thus, if the stud is incorrectly aligned with the opening at the forward end of the barrel, it will engage the disk of the restrainer member and will not come into contact with the barrel (Fig. 3) until it has first passed through the opening 19 of the disk by which it is centered in position for proper engagement with the yieldable sections. With previous types of sockets of this general type the yieldable segments have not been protected by a portion located above and covering most of the ends of the segments.

Although I have illustrated and described a preferred embodiment of my invention, I do not wish to be limited thereby because the scope of my invention is best defined by the following claims.

I claim:

1. A snap fastener socket device comprising a socket member having a plurality of yieldable sheet metal portions circularly arranged and forming an open-ended barrel providing a stud-receiving passage, a base portion extending from one end of said passage and flaring radially and outwardly therefrom to provide an annular supporting portion spaced radially from and outwardly of the stud-receiving opening, and a guiding and restraining member secured to said supporting portion and extending radially inwardly to overlie a substantial portion of the outer end of the barrel, said guiding and restraining member being formed with a central stud-receiving aperture immediately adjacent the outer end of the barrel, said aperture being of a diameter substantially equal to the maximum stud diameter to permit the passage of the stud therethrough.

2. A snap fastener socket device comprising a socket member having a plurality of yieldable sheet metal portions circularly arranged and forming an open-ended barrel providing a stud-receiving passage, a base portion extending from one end of said passage and flaring radially and outwardly therefrom to provide an annular supporting portion spaced radially from and outwardly of the stud-receiving opening, and a guiding and restraining member secured to said supporting portion and extending radially inwardly to overlie a substantial portion of the outer end of the barrel, said guiding and restraining member being formed with a central stud-receiving aperture of a diameter substantially equal to the maximum stud diameter providing a continuous wall immediately adjacent the outer end of the barrel to engage the stud and limit lateral movement of the yieldable portion when the stud and socket are in fastened engagement.

3. A snap fastener socket device comprising a socket member of substantially S-shaped cross-sectional configuration having a central open-ended resilient stud-receiving barrel and an outwardly spaced supporting portion, a guiding and restraining member assembled therewith and having its marginal free edges crimped over said supporting portion and the central portion of said guiding and restraining member overlying a substantial portion of the stud-receiving barrel, said guiding and restraining member being formed with a central stud-receiving aperture immediately adjacent the outer end of the barrel, the diameter of said aperture being substantially equal to the maximum stud diameter to permit the passage of the stud therethrough.

WALTER I. JONES.